United States Patent [19]

Morikawa et al.

[11] 3,843,738

[45] Oct. 22, 1974

[54] PRODUCTION OF CYCLODODECATRIENE

[75] Inventors: Hiroyuki Morikawa; Noriyoshi Tamura; Takahiro Sato; Kazuo Yamagishi; Takeo Nagai, all of Ami-machi, Japan

[73] Assignee: Mitsubishi Petrochemical Company, Limited, Tokyo, Japan

[22] Filed: Dec. 11, 1972

[21] Appl. No.: 314,228

[30] Foreign Application Priority Data
Dec. 15, 1971 Japan.............................. 46-101064
Dec. 15, 1971 Japan.............................. 46-101065
Aug. 4, 1972 Japan.............................. 47-78138

[52] U.S. Cl............................................. 260/666 B
[51] Int. Cl............................ C07c 3/10, C07c/3/16
[58] Field of Search ................................. 260/666 B

[56] References Cited
UNITED STATES PATENTS
3,076,045 1/1963 Schneider et al. .............. 260/666 B
3,149,173 9/1964 Wittenberg et al. ............. 260/666 B
3,280,205 10/1966 Yosida et al. .................... 260/666 B
3,641,187 2/1972 Furukawa et al. ............... 260/666 B
3,644,548 2/1972 Takahasi et al. ................. 260/666 B Primary Examiner—Veronica O'Keefe
Attorney, Agent, or Firm—Wenderoth, Lind & Ponack

[57] ABSTRACT

Cyclodedocatriene-(1,5,9) is produced by causing a B-B fraction containing from 25 to 90 percent by weight of butadiene to contact a Ziegler catalyst thereby to accomplish cyclic trimerization of the butadiene, the catalyst comprising, in combination: 1) a specific titanium compound; 2) a compound selected from specific five-membered heterocyclic compounds, specific benzene derivatives, and cyclic compounds; 3) a specific sulfur compound or a specific phosphorus compound; and 4) a specific aluminum compound.

12 Claims, No Drawings

PRODUCTION OF CYCLODODECATRIENE

BACKGROUND OF THE INVENTION

This invention relates generally to the production of cyclododecatriene and more particularly to a process for producing cyclododecatriene of high purity through the use of low-purity butadiene.

The catalytic trimerization of butadiene to produce cyclic trimers is known, and Ziegler catalysts constitute one group of catalysts used for this purpose. Ziegler catalysts are sometimes called "Zielger-Natta" catalysts. Ziegler catalysts are combinations of transition metal components and organo-metal compounds and, in some cases, are further combined with electron donors and other modifiers. Representative examples of a transition metal component and an organo-metal compound are, respectively, a titanium compound and an organoaluminum compound. For the modifier, an electron donor containing nitrogen, oxygen, phosphorous, or sulfur is suitable.

Cyclic trimerization of butadiene with a Ziegler catalyst and with high-purity butadiene (of at least 90-percent purity) as a starting material is variously known, but if it were possible, the production of cyclododecatriene of high purity with low-purity butadiene, particularly a so-called B-B fraction, which is the $C_4$ fraction obtained by naphtha cracking, as a starting material would be highly advantageous.

However, while the possibility of using such low-purity butadiene is mentioned in some published references, there is no reproducibility of results because of the types and/or quantities of the various impurities contained in low-purity butadienes. Consequently, there is yet no practical process for producing high-purity cyclododecatriene through the intentional use of low-purity butadiene as a starting material as far as we are aware.

As impurities which become poisons of the catalyst in the butadiene trimerization reaction, acetylene and allene are known, one reference being *Annalen*, Vol. 681, p. 10, 1965. Furthermore, in the case of nickel-based, chromium-based, and titanium-based catalysts suitable for use in cyclic trimerization of high-purity butadiene, if olefins and acetylenes coexist with the butadiene, linear cotrimers and cyclic cotrimers thereof will be formed as by-products, whereby the yield of the butadiene cyclic trimer will become poor. This result is indicated in Japanese Patent Publication Nos. 22580/1965, 16941/1966, and 29945/1967. Therefore, in the case where high-purity butadiene is used as the starting material, also, a preparatory hydrogenation process step is ordinarily necessary in order to remove these impurities.

Accordingly, a B-B fraction containing substantial acetylenes, allene, and other impurities cannot be used as a starting material for producing high-purity cyclododecatriene unless a considerably thorough prepurification step is resorted to.

Various proposals have heretofore been made relative to improving the activity of the catalyst for butadiene cyclic trimerization. As far as we are aware, however, although these improved catalysts prepared by adding various modifiers may afford production of cyclododecatriene with high yield when high-purity butadiene is used, in the case where a B-B fraction is used as the starting butadiene, the catalytic activity drops and, at the same time, the quantity of the by-product impurities within the cyclododecatriene fraction formed also increases remarkably, whereby high-purity cyclododecatriene cannot be obtained.

The by-product impurities within the cyclododecatriene fraction formed are characteristic in the case where a B-B fraction is used as the starting butadiene and are hydrocarbons boiling within the range of from 200 to 260°C, being principally linear cotrimers of 1,3-butadiene and other reactive impurities (olefins, allene, and acetylenes).

By-product impurities of this character are not produced in the case where high-purity butadiene is used as the starting material. Accordingly, a catalyst which is excellent for cyclic trimerization of high-purity butadiene is not necessarily suitable also for the case where a starting butadiene such as a B-B fraction having a large impurity content is used. Therefore, development of optimum catalyst systems according to the starting butadienes is needed.

However, the development of a catalyst suitable for a B-B fraction is not easy because of the great number of factors which must be considered.

Heretofore, it has been indicated that the modifying effects respectively due to addition of various additives to a Ziegler catalyst for cyclic trimerization of high-purity butadiene respectively differ depending on the type of the transition metal compound component. As a result of our study of this point we have discovered that, in catalyst systems wherein a single additive is used independently by itself in each case, those producing cyclic trimers of good selectivity coefficients tend to have slow reaction rates, while, on the other hand, those producing high reaction rates are accompanied by undesirable phenomena such as a large quantity of by-product polymers. These undesirable results become even more conspicious with a starting material such as a B-B fraction containing a large quantity of impurities.

Furthermore, in the case where a starting material such as a B-B fraction of a multiple ingredient system is used, selection or modification of the catalyst system for the purpose of preventing the formation as a by-product of co-oligomers with impurities within the starting material, as mentioned hereinbefore, is a primary necessity. In addition, the selection or modification of the catalyst system for improving its poison resistance with respect to allene and acetylenes which become catalyst poisons of ordinary Ziegler catalysts is also necessary.

On the other hand, it will be obvious that such selection or modification of the catalyst system for oligomerization must not lead to promotion of polymerization producing high polymers of the olefin component. In this connection, it is to be noted that with conventional catalysts for the production of butadiene cyclic trimers, high polymers of the olefin component are easily formed.

SUMMARY OF THE INVENTION

It is an object of this invention to provide a commercially feasible process for producing cyclododecatriene through the use of a B-B fraction as the starting material. In accordance with this invention, achievement of this object is contemplated through the use of a specific Ziegler catalyst which has been modified with a plurality of additives.

More specifically, this invention provides a process for producing cyclododecatriene-(1,5,9) which is characterised in that a B-B fraction obtained by the cracking of naphtha and containing from 25 to 90 percent by weight of butadiene is caused to contact a Ziegler catalyst comprising a combination of the following components (1), (2), (3), and (4) thereby to accomplish cyclic trimerization of the butadiene.

1. A titanium compound representable by the general formula $TiX_nY_{4-n}$ or $TiOZ_2$, where: X is a halogen; Y is an alkoxy group, a chloroalkoxy group, an aryloxy group, a chloroaryloxy group, an acetylacetonato group, or an acetoacetato group; Z is X or Y; and n is an integer of from 0 to 4.
2. A compound selected from the following group:
   a. five-membered heterocyclic compound containing an element selected from the group consisting of oxygen and nitrogen;
   b. benzene derivative representable by the following general formula:

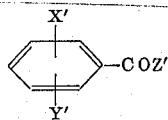

where: each of X' and Y' is hydrogen, a hydroxyl group, an alkyl group, an alkoxy group, a halogen, a nitro group, an amino group, a mono- or dialkyamino group, an aminoalkyl group, an aldehyde group, a carboxylic acid group, or an esterified derivative thereof; and Z' is hydrogen, a halogen, an amino group, or a mono- or dialkylamino group;
   c. cyclic compound representable by the following general formula:

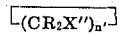

where: X'' is oxygen or sulfur; R is hydrogen or an alkyl group; and n is the integer 3 or 4.

3. A sulfur compound representable by the general formula

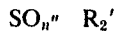

and/or a phosphorus compound representable by the general formula

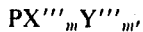

where: each of R' and X''' is an alkyl group, an aryl group, an alkoxy group, or an aryloxy group; Y''' is oxygen or a halogen; n'' is the integer 1 or 2; m is the integer 1, 2, or 3; and m' is 0 or 1.

4. An aluminum compound representable by the following general formula.

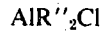

where: R'' is an alkyl group or an aryl group.

The alkyl moieties herein referred to as "alkyl group" and "alkoxy group" are understood to include cycloalkyl groups.

The nature, further features, and utility of this invention will be apparent from the following detailed description beginning with a consideration of the general aspects of the invention and concluding with specific examples of practice illustrating preferred embodiments of the invention.

DETAILED DESCRIPTION

1. Catalyst

A catalyst to be used in the process of this invention comprises a combination of a titanium compound, a compound selected from, five-membered heterocyclic compounds, benzene derivatives and cyclic compounds, a compound containing phosphorous and sulfur, and an organoaluminum compound. These ingredients are considered below in detail.

Titanium compound

The titanium compound is one which is representable by the general formula $TiX_nY_{4-n}$, wherein: X is a halogen; Y is an alkoxy group, a cycloalkoxy group, a chloroalkoxy group containing from 1 to 10 carbon atoms, in each of these groups, an acetylacetonato group, an acetoacetato group, an aryloxy group, or a chloroaryloxy group, the aryloxy group in each case being preferably a phenoxy group or a methyl-substituted phenoxy group; and $n$ is 0 or the integer 1, 2, 3, or 4.

Alternatively, the titanium compound is one which is representable by the general formula $TiOZ_2$, where: Z is a halogen, an alkoxy group, a cycloalkoxy group containing from 1 to 10 carbon atoms, in each of these groups, an aryloxy group, a chloroaryloxy group, being preferably a phenoxy group or a methyl-substituted phenoxy group in each case, an acetylacetonato group, or an acetoacetato group. Specific examples of titanium compound which we have found suitable for use in the process of this invention are:

titanium tetrachloride
titanium tetrabromide
titanium butoxytrichloride
titanium diethoxydichloride
titanium triethoxychloride
titanium tetrabutoxide
titanium tetraphenoxide
titanium phenoxytrichloride
titanium cresoxytrichloride
titanium chloropropoxytrichloride
titanium di-(chloroethoxy) dichloride
titanium trichloroacetylacetonato
titanium dichlorodiacetylacetonato
titanyl chloride
titanyl bromide, and
titanyl dibutoxide.

Five-membered heterocyclic compound

This compound is representable by the general formula

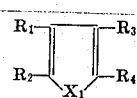

where: $X_1$ is oxygen or $NR_o$, where $R_o$ is hydrogen or an alkyl group, and each of $R_1$, $R_2$, $R_3$, and $R_4$ is hydrogen, an alkyl group, an alkoxy group, a halogen, a carboxylic said group or an esterified product thereof, an aldehyde group, a —$CH_2OH$ group or an esterified derivative thereof, the alcohol moeity containing up to 10 carbon atoms, a —$CH_2COOH$ group or an esterified derivative thereof, the alcohol moiety containing up to 10 carbon atoms, an acetyl group, a —COCl group, a —$CH_2NH_2$ group, or a —$CH_2SH$ group. These groups contain 20 or less carbon atoms, preferably 10 or less carbon atoms. Specific examples of suitable compounds are:
2-methylfuran
2,5-dichlorofuran
2,5-dibromofuran
furfural
furfuryl alcohol
furan-2-carboxylic acid
furan-3-carboxylic acid
furan-2,5-dicarboxylic acid
furfurylamine
furfurylmercaptan
2-furoylchloride
furfurylacetate
furfuryl methyl ketone
2,5-dimethylpyrrole
pyrrole-2-carboxylic acid
pyrrole-2-aldehyde
2-acetylpyrrole, and
2,4-dimethyl-3,5-dicarbethoxypyrrole.

Benzene derivative

The benzene derivative is representable by the general formula

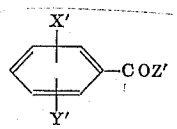

where: each of $X'$ and $Y'$ is hydrogen, a hydroxyl group, an alkyl group, an alkoxy group containing from 1 to 10 carbon atoms, in each of these groups, a halogen, a nitro group, an amino group, a mono- or dialkylamine group, the alkyl group containing from 1 to 10 carbon atoms, an aminoalkyl group containing from 1 to 10 carbon atoms, an aldehyde group, a carboxylic acid group, or an esterified derivative of the carboxylic acid group containing from 1 to 10 carbon atoms in each of these groups, and $Z'$ is hydrogen, a halogen, an amino group, or a mono- or dialkylamino group containing from 1 to 10 carbon atoms, in each of these groups. Specific examples are:
p-tolualdehyde
cuminaldehyde
o-, m-, and p- phthalaldehydes
benzaldehyde
naphthylaldehyde
salicylaldehyde
p-hydroxybenzaldehyde
vanillin (4-hydroxy-3-methoxybenzaldehyde)
veratralaldehyde
o-, m-, and p- chlorobenzaldehydes
o-, m-, and p- methoxybenzaldehydes
2,4-dichlorobenzaldehyde
2,5-dichlorobenzaldehyde
2,6-dichlorobenzaldehyde
2,5-dimethoxybenzaldehyde
3,5-dimethoxybenzaldehyde
2-oxy-3-methylbenzaldehyde
2-oxy-4-methylbenzaldehyde
3-chloro-4-oxybenzaldehyde
m-, and p- dimethylaminobenzaldehydes
o-, m- and p- nitrobenzaldehydes
4-chloro-2-nitrobenzaldehyde
4-bromobenzaldehyde
4-acetylbenzaldehyde
4-chloroisophthalaldehyde
3-formylsalicylic acid
4-chlorosalicylaldehyde
benzamide
2-methylbenzamide
benzoyl chloride
benzoyl bromide
benzoyl iodide
p-chlorobenzoyl chloride
p-anisoyl chloride (p-methoxybenzoyl chloride), and
naphthoyl chloride.

Cyclic compound

The cyclic compound is one which contains oxygen or sulfur and is representable by the general formula

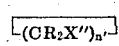

where: $X''$ is oxygen (O) or sulfur (S); R is hydrogen or an alkyl group, preferably of the order of from 1 to 10 carbon atoms; and $n'$ is the integer 3 or 4. Examples are as follows, the H in C—H bonds being omitted;

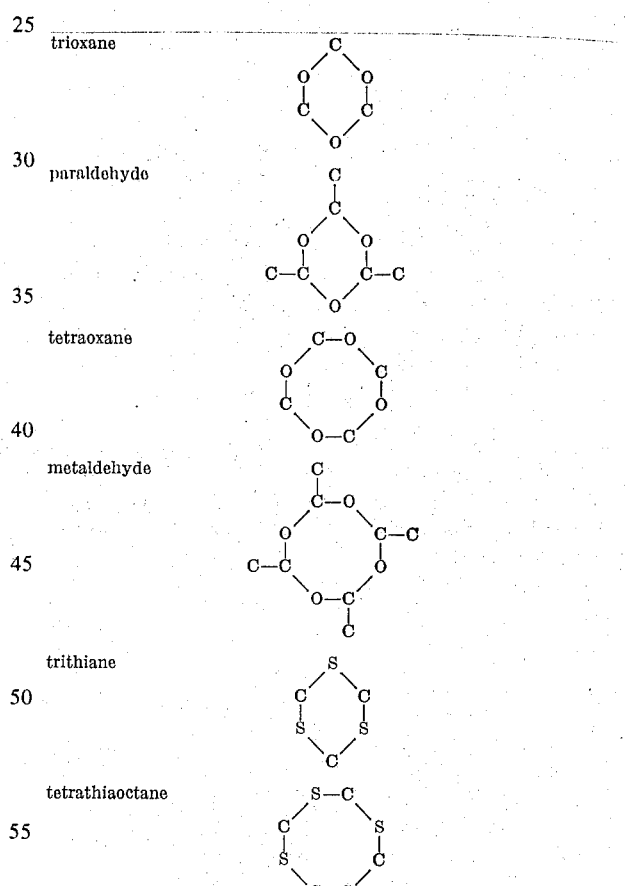

In the case where any of the above enumerated cyclic compound is substituted by similar compounds, straight-chain ethers or various formals, the results are invariably inferior to those obtained through the use of the catalyst system of this invention, as is apparent from Table 1. From a comparison of such results, it may be said that the modifier of this invention is extremely effective and, moreover, unique.

TABLE 1

| Modifier | | CDT yield |
|---|---|---|
| (1) Example of this invention: | | |
| Trioxane | (C,O,C,O,C,O ring) | 85.1 |
| (2) Comparison with like compounds (H in C—H bonds is omitted): | | |
| (1) Example of one —O—: | | |
| Exetane | (C,C,C,O ring) | 34.1 |
| Tetrahydrofuran | C—C, C, C, O | 42.3 |
| (2) Example of two —O—: | | |
| Dioxane | (O,C,C,C,C,O ring) | 53.4 |
| Dioxolane | C—C, O, O, C | 50.1 |
| Methylal | C—O—C—O—C | 49.3 |
| (3) Example of three —O—: | | |
| Trioxetane | C—C, O, O, C, C, O | 51.0 |
| Paraformaldehyde | HO—(C—O)$_n$—H | 43.1 |

Note:
1. The cyclododecatriene, CDT, yield is relative to the butadiene content in the B-B fraction.
2. Reaction conditions—
   Titanium compound:
      Ti (OBu) Cl$_3$ (titanium butoxytrichloride), 0.114g.
   Modifier (oxygenated compound):
      Compounds of Table 1, same millimoles as Ti compound
   Modifier (sulfur compound):
      diphenyl sulfoxide, 0.025 g.
   Modifier (phosphorus compound):
      triphenyl phosphine oxide, 0.035 g.
   Aluminium compound:
      diethylaluminum chloride, 0.363 g.
   Starting material, B-B fraction composition:
      1,3-butadiene 38(%)
      ethyl-acetylene 0.1(%)
      vinyl-acetylene 0.4
      butene + butane 61.1
      allene 0.2(%)
      ethyl acetylene 0.15(%)
      cyclopentadiene 0.05

Furthermore, the aluminum compound which is one component of the instant catalyst system is limited to dialkyl- or diarylaluminum monochloride and is characteristic in contrast to alkylaluminum dichloride, which exhibits almost no effectiveness. This monochloride has characteristics differing from those of a catalyst system for producing cyclododecatriences depending on pure butadiene.

Sulfur compound

The sulfur compound is representable by the general formula $$SO_{n'} R'_2$$

where R' is an alkyl group, an alkoxy group containing from 1 to 10 carbon atoms, preferably from 1 to 4 carbon atoms, in each case, an aryl group, or an aryloxy group (preferably a phenyl group or a methyl-substituted phenyl group in each case), or two R' groups are fused into an alkylene or alkenylene, which may have a methyl-substituent thereon, to form a ring containing the sulfur atom, preferably of 4 carbon atoms, and n' is the integer 1 or 2. Specific examples are as follows:

fulfolene
methylsulfolene
tetramethylenesulfone
dimethylsulfone
diethylsulfone
diphenylsulfone
dimethylsulfite
dibutylsulfite
dimethylsulfoxide
dipropylsulfoxide
diphenylsulfoxide
tetramethylenesulfoxide (sulfolane)

Phosphorus compound

The phosphorus compound is representable by the general formula $$PX'''_m Y'''_{m'}$$

where: X''' is an alkyl group, an alkoxy group (of the order of from 1 to 10, preferably from 1 to 4 carbon atoms, each case), an aryl group, or an aryloxy group (either a phenyl group or a methyl-substituted phenyl group in each case), or two X''' groups are fused into an alkylene or alkenylene, which may have a methyl-substituent thereon, to form a ring containing the phosphorus atom, preferably of 4 carbon atoms; Y''' is oxygen or a halgen; m is the integer 1, 2, or 3; and m' is zero or the integer 1. Specific examples are as follows.

trimethylphosphine oxide
triethylphosphine oxide
tripropylphosphine oxide
triphenylphosphine oxide
trimethyl phosphate
triethyl phosphate
tributyl phosphate
triphenyl phosphate
tricresyl phosphate
phospholane
phospholene
diethyl chlorophosphate
diphenyl chlorophosphate
chlorodibutylphosphine
chlorodiphenylphosphine Aluminum compound The aluminum compound is representable by the general formula $$AlR''_2Cl$$

where R'' is an alkyl group of the order of from 1 to 10, preferably from 1 to 4 carbon atoms or an aryl group, preferably a phenyl group or a methyl-substituted phenyl group. Specific examples are as follows:

dimethylaluminum chloride diethylaluminum chloride
diisobutylaluminum chloride
dioctylaluminum chloride
diphenylaluminum chloride Catalyst composition The quantitative proportions of the various component compounds used in the catalyst system according to this invention are important. We have found that these proportions must be within the limits set forth below. If the quantitative balance between these components is disturbed, the objective catalyst performance cannot be obtained.

a. The quantity of the five-membered heterocyclic compound and the benzene derivative compound ($X_{add}$), in terms of mole ratio to the titanium compound (T), $X_{add}/T$, is from 0.15 to 1.5, preferably from 0.5 to 1.0.

b. The quantity of the cyclic compound ($Y_{add}$), in terms of mole ratio to the titanium compound (T), $Y_{add}/T$, is from 0.1 to 1.5, preferably from 0.2 to 0.8.

c. The quantities of the sulfur compound (S) and/or phosphorus compound (P), in general, in terms of mole ratios S/T and P/T, respectively, are from 0.1 to 2.0 and from 0.01 to 1.0.

We have found that from the viewpoint of resistance to catalyst poisoning due to various impurities, the concurrent use of these two compounds is desirable. In this case, the optimum quantity thereof, in terms of mole ratio (S+P)/T, is from 0.5 to 0.8 in the case of the above limitations $a$ and $b$ and from 0.1 to 1.0 in the case of the above limitation $c$, and in terms of mole ratio S/P is from 10 to 20.

d. The quantity of the aluminum compound (A) can be varied over a broad range. In general, it is from 1 to 100, preferably from 3 to 10, in terms of mole ratio A/T.

Catalyst preparation

The catalyst preparation can be accomplished, in general, by mixing the components in an atmosphere of an inactive gas or in an atmosphere of gas of the starting B-B fraction.

We have found that an effective procedure comprise first causing the titanium compound, the compound selected from the five-membered heterocyclic compound, the benzene derivatives and the cyclic compounds, and the sulfur compound and/or phosphorus compound to contact in the sequence named in a solvent, agitating the resulting mixture, and then adding the aluminum compound thereto. We have found further that a suitable preparation temperature is in the range of from 0 to 80°C, particularly from 30 to 50°C.

2. Trimerization Reaction

Solvent

While a trimerization reaction can be carried out irrespective of the presence or absence of a solvent, it is ordinarily a suitable practice to carry out the operation in the presence of a solvent.

Aromatic hydrocarbons such as benzene, toluene, and xylene and aliphatic hydrocarbons such as hexane and heptane which are ordinarily used in catalytic trimerization reactions of this kind are suitable for use as the solvent in the trimerization reaction. An aromatic hydrocarbon which is convenient for the rendering the catalyst soluble is particularly suitable.

Reaction temperature and pressure

While the reaction temperature can be varied within a range of from 0 to 100°C, a preferably range is from 30 to 80°C. The reaction can be carried out at atmospheric pressure or higher pressure.

3. Starting Material

B-B fraction

The "B-B fraction" which is used as a starting material in the process of this invention is a $C_4$-fraction obtained by naphtha cracking. The term "naphtha cracking" is herein used to designate the process of generally producing unsaturated olefin and dienes by thermally cracking naphtha. The details of this process are set forth, for example, in "Sekiyu to Sekiyu Kagaku" (Petroleum and Petroleum Chemistry), Vol. 12, No. 1, p. 47.

This fraction is a mixture having, in general, the following composition, wherein the quantities are in percent by weight:

| | |
|---|---|
| 1,3-butadiene | 25 – 50 % |
| butane + butene | 50 – 70 % |
| allene | 0.02 – 2 % |
| methylacetylene | 0.02 – 2 % |
| ethylacetylene | 0.05 – 2 % |
| vinylacetylene | 0.05 – 2 % |
| cyclopentadiene | 0.1 – 2 % |

A B-B fraction from a naphtha-cracking process is ordinarily obtained by distillation, and, for this reason, it may be considered to have been subjected to certain refining steps, but in the case where a B-B fraction is to be used as the starting material in the practice of this invention, it is also possible, depending on the necessity, to subject the fraction to a further distillation. Accordingly, the term "B-B fraction" as herein used is applicable to one containing from 25 to 90 percent by weight of butadiene.

Butadiene content and other features

As long as the butadiene content is within the range of from 25 to 90 percent by weight, it is possible to attain the advantageous features of this invention.

As a result of our research, we have found that when the butadiene content is between 60 and 90 percent by weight, the purity of the cyclododecatriene is always from 99.8 to 99.98 percent, whereby the purification process step is remarkably simplified.

Furthermore, it is preferably that the cyclopentadiene content be less than 0.1 percent be weight.

Therefore, it can be said that it is even more preferable to reduce the cyclopentadiene content to less than 0.1 percent by weight and, at the same time, to concentrate the butadiene content to a value of from 60 to 90 percent by weight.

It is desirable that the acetylene and allene content be less than 3 percent by weight.

In order to indicate still more clearly the nature and utility of this invention, the following specific examples are provided, constituting preferred embodiments of the invention and results as well as comparative examples, it being understood that these examples are presented as illustrative and are not intended to limit the scope of the invention.

Example A1

An autoclave of 500-cc. capacity was purged with nitrogen gas and then charged with 100 cc. of toluene, 0.124 gram (g.) of chloropropoxytrichlorotitanium, 0.024 g. of furfural, 0.026 g. of tetramethylenesulfoxide, 0.014 g. of triphenylphosphine oxide, and 0.303 g.

of diethylaluminum chloride, which were mixed at 40°C to prepare a catalyst.

Next, 60 g. of a B-B fraction which had been pretreated to reduce its cyclopentadiene content was added to the process catalyst thus prepared and agitated therewith for 3 hours at 70°C. The B-B fraction contained 38 percent of 1,3-butadiene, 0.2 percent of allene, 0.1 percent of methylacetylene, 0.15 percent of ethylacetylene, 0.4 percent of vinylacetylene, 0.05 percent of cyclopentadiene, and 61.1 percent of a mixture of butane + butene.

Thereafter, methanol was added to the process materials to decompose the catalyst, and the formed product was separated by distillation.

As a result, 18 g. of a cyclododecatriene fraction of a purity of 99.5 percent and of boiling points from 235°C to 250°C was obtained.

The yield of pure cyclododecatriene based on the butadiene in the process batch, that is, the yield based on the butadiene content within the B-B fraction supplied, was 78 percent. The quantity of by-product polymers was 2.7 g.

When, in place of the above described starting material, 60 g. of a raw B-B fraction which had not been pretreated and contained 0.18 percent of cyclopentadiene and other ingredients of the same composition as in the above described starting material was used, 6.6 g. of a cyclododecatriene fraction of a purity of 82.1 percent was obtained in a yield of 24 percent together with 16.5 g. of by-product polymers.

Furthermore, in the case where furfural and tetramethylene sulfoxide were not used in the catalyst system, 8.7 g. of a cyclododecatriene fraction of a purity of 96.4 percent was obtained in a yield of 36.6 percent together with 23.3 g. of by-product polymers. In the case where furfural and triphenylphosphine oxide were not used, a cyclododecatriene fraction of a purity of 97.6 percent was obtained in a yield of 37.2 percent together with 6.8 g. of by-product polymers.

Examples A2 through A14

The procedure set forth in Example A1 was carried out with 5-membered heterocyclic compounds and catalysts of various species according to this invention as indicated in Table 2, whereupon the results as set forth also in Table 2 were obtained.

Table 2

| Example | Starting material (g) | Solvent (cc) | Ti compound (g) | 5-membd. heterocyc. compd. (g) | S compound (g) | P compound (g) | Al compound (g) | CDT* fraction (g) | CDT* purity (%) | CDT* yield (%) | By-product polymers (g) |
|---|---|---|---|---|---|---|---|---|---|---|---|
| A1 | B-B fraction 60g | Toluene 100 | Chloropropoxy-trichlorotitanium 0.124 | furfural 0.024 | tetramethylene sulfoxide 0.026 | triphenyl-phosphine oxide 0.014 | diethylaluminum chloride 0.303 | 18 | 99.5 | 78 | 2.7 |
| A2 | do. 60 | benzene 100 | di(chloroethyoxy)dichlorotitanium 0.28 | do. 0.77 | diphenyl sulfoxide 0.16 | triphenyl phosphate 0.003 | do. 0.126 | 17.7 | 99.4 | 77 | 3.5 |
| A3 | do. 60 | do. 100 | furfuryl titanium tetrachloride 0.095 | acetate 0.028 | sulfolane 0.03 | phospholane 0.002 | do. 0.484 | 18.01 | 99.3 | 79 | 3.4 |
| A4 | do. 60 | toluene 100 | titanium tetraphenoxide 0.21 | 2,5-dichlorofuran 0.021 | dimethylsulfone 0.024 | chlorodiphenyl phosphine 0.002 | do. 1.21 | 15.2 | 99.2 | 66 | 4.5 |
| A5 | do. 60 | do. 100 | titanium butoxytrichloride 0.114 | furfural 0.048 | dimethyl sulfoxide 0.035 | — | do. 0.272 | 15.3 | 99.1 | 67 | 3.4 |
| A6 | do. 60 | benzene 100 | titanyl chloride 0.068 | furfuryl mercaptan 0.017 | tetramethylene sulfoxide 0.031 | diphenyl chlorophosphate 0.008 | do. 0.605 | 15.0 | 99.0 | 65 | 3.0 |
| A7 | do. 60 | toluene 100 | titanium trichloroacetylacetate 0.108 | furan-2-carboxylic acid 0.011 | sulfoxide 0.91 | triethylphosphine-oxide 0.006 | do. 0.484 | 15.8 | 99.3 | 69 | 3.2 |
| A8 | B-B fraction 60 | toluene 100 | titanium diethoxydichloride 0.105 | furfuryl amine 0.01 | dimethyl sulfoxide 0.023 | phospholene 0.0004 | diethylaluminum chloride 0.908 | 16.3 | 99.2 | 71 | 4.1 |
| A9 | do. 60 | do. 100 | titanium tetrachloride 0.095 | 2-furoyl chloride 0.065 | methylsulfolene 0.02 | triethyl phosphate 0.003 | diisobutyl-aluminum chloride 0.618 | 15.4 | 99.4 | 67 | 5.5 |
| A10 | do. 60 | do. 100 | titanium chloropropoxytrichloride 0.124 | pyrrole-2-aldehyde 0.014 | dimethyl sulfoxide 0.023 | tributyl phosphate 0.008 | diethylaluminum chloride 0.484 | 15.1 | 99.1 | 65.5 | 3.0 |
| A11 | do. 60 | do. 100 | titanium phenoxytrichloride 0.124 | 2-acetylpyrrole 0.016 | dibutyl sulfite 0.039 | — | do. 0.484 | 14.7 | 99.1 | 64 | 4.4 |
| A12 | do. 60 | do. 100 | titanium tetrachloride 0.095 | pyrrole-2-carboxylic acid 0.017 | diphenyl sulfoxide 0.091 | triphenyl phosphate 0.015 | do. 0.363 | 15.6 | 99.3 | 68 | 4.7 |

TABLE 2—Continued

| Example | Starting material (g) | Solvent (cc) | CATALYST SYSTEM | | | | | RESULTS | | | By-product polymers (g) |
|---|---|---|---|---|---|---|---|---|---|---|---|
| | | | Ti compound (g) | 5-membd. heterocyc. compd. (g) | S compound (g) | P compound (g) | Al compound (g) | CDT* fraction (g) | CDT* purity (%) | CDT* yield (%) | |
| A13 | do. 60 | do. 100 | titanyl dibutoxide 0.105 | furfuryl methylketone 0.028 | — | triphenyl phosphinoxide 0.003 | do. 1.815 | 14.3 | 99.1 | 62 | 5.7 |
| A14 | do. 60 | benzene 100 | titanium chloropropoxytrichloride 0.124 | 2-methylfuran 0.021 | dimethyl sulfoxide 0.031 | — | do. 0.484 | 14.7 | 99.0 | 64 | 2.9 |

*CDT cyclododecatriene

Example B1

An autoclave of 500-cc. capacity was purged with nitrogen gas and then charged with 100 cc. of toluene, 0.247 g. of phenoxytrichlorotitanium, 0.113 g. of parachlorobenzaldehyde, 0.033 g. of triphenyl phosphate, 0.182 g. of diphenyl sulfoxide, and 0.968 g. diethylaluminum chloride, which were mixed at 40°C to prepare a catalyst.

Next, 60 g. of a B-B fraction which had been pretreated to reduce its cyclopentadiene content and was of the same composition as that in Example A1 was added to the catalyst thus prepared and agitated therewith for 3 hours at 70°C.

Thereafter, methanol was added to the process materials to decompose the catalyst, and the formed product was separated by distillation.

As a result, 18.7 g. of a cyclododecatriene fraction of a purity of 99.2 percent and of boiling points from 235°C to 250°C was obtained.

The yield of pure cyclododecatriene based on the butadiene charged, that is, the yield based on the butadiene content within the B-B fraction supplied, was 81.3 percent. The quantity of by-product polymers was 3.7 g.

In the case where parachlorobenzaldehyde and diphenyl sulfoxide were not used in the above described catalyst system, 8.5 g. of a cyclododecatriene fraction of a purity of 95.8 percent was obtained in a yield of 35.6 percent together with 20.3 g. of by-product polymers. In the case where parachlorobenzaldehyde and triphenyl phosphate were not used, 8.8 g. of a cyclododecatriene fraction of a purity of 96.4 percent was obtained in a yield of 37.3 percent together with 5.1 g. of by-product polymers.

Examples B2 through B14

The procedure set forth in Example B1 was carried out with benzene derivatives and catalysts of various species according to this invention as indicated in Table 3, whereupon the results set forth also in Table 3 were obtained.

Comparison Example 1

1. The procedure of Example B-1 was carried out with 100 cc. of toluene, 0.10 g. of titanium tetrachloride, 0.04 g. of acetaldehyde, 0.25 g. of diethylaluminum chloride, and 60 g. of a B-B fraction of the same composition as that in Example B1.

As a result, 6.4 g. of a cyclododecatriene fraction of a purity of 93.5 percent was obtained in a yield of 26 percent together with 15.9 of by-product polymers.

In addition, the procedure was carried out with a catalyst system prepared by further adding 0.18 g. of diphenyl sulfoxide and 0.03 g. of triphenyl phosphate to the above described catalyst system, whereupon 8.9 g. of a cyclododecatriene fraction of a purity of 15.2 percent was obtained in a yield of 37 percent together with 9.1 g. of by-product polymers.

2. The procedure of Example B-1 was carried out with 100 cc. of toluene 0.10 g. of titanium tetrachloride, 0.18 g. of benzophenone, 0.25 g. of diethylaluminum chloride, and 60 g. of a B-B fraction of the same composition as that in Example B1.

As a result, 5.6 g. of a cyclododecatriene of a purity of 94.6 percent was obtained in a yield of 23 percent together with 10.5 g. of by-product polymers.

Furthermore, the procedure was carried out with a catalyst system prepared by further adding 0.18 g. of diphenyl sulfoxide to the above described catalyst system, whereupon 8.4 g. of a cyclododecatriene fraction of a purity of 95.3 percent was obtained with 9.2 g. of by-product polymers.

3. The procedure of Example B-1 was carried out with 100 cc. of toluene, 0.10 g. of titanium tetrachloride, 0.18 g. of benzophenone, 0.25 g. of ethylaluminum sesquichloride, and 60 g. of a B-B fraction of the same composition as that in Example B1.

As a result, 4.8 g. of a cyclododecatriene of a purity of 75.2 percent was obtained in a yield of 16 percent together with 19.5 g. of by-product polymers.

As indicated by the results of the above Comparison Examples, the use of complex catalyst systems with aliphatic aldehydes and benzophenone is not desirable in the B-B fraction method because of the resulting low yields and purities and large quantity of by-product polymers. By the pure butadiene method, high yields are attained with these catalyst systems.

Example C1.

An autoclave of 500 cc. capacity was purged with nitrogen gas and then charged with 100 cc. of toluene, 0.114 g. (0.5 m mole) of titanium butoxy trichloride, 0.045 g. (0.5 m mole) of trioxane, 0.025 g. of diphenyl sulfoxide, 0.035 g. (0.13 m mole) of triphenylphosphine oxide, and 0.363 g. (3.0 m moles) of diethylaluminum chloride, which were mixed at 40°C to prepare a catalyst.

Next, 60 g. of a B-B fraction which had been pretreated to reduce its cyclopentadiene content and was of the same composition as that in Example A1 was added to the process catalyst thus prepared and agitated therewith for 3 hours at 70°C.

Thereafter, methanol was added to the process materials to decompose the catalyst, and the formed product was separated by distillation.

TABLE 3

| Ex. | Starting material | Solvent | | | Catalyst system | | | | | | | | | | Results | | | |
|---|---|---|---|---|---|---|---|---|---|---|---|---|---|---|---|---|---|---|
| | | | G. | Cc. | Ti compound | Benzene derivative | G. | S compound | G. | P compound | G. | Al compound | G. | CDT fraction, G. | CDT purity, percent | CDT yield, percent | By-product polymers, G. |
| B1 | B-B fraction | Toluene | 60 | 100 | Phenoxytrichlorotitanium | Parachlorobenzaldehyde | 0.247 | Diphenyl sulfoxide | 0.113 | Triphenyl phosphate | 0.183 | Diethylaluminum chloride | 0.968 | 18.7 | 99.2 | 81.3 | 3.7 |
| B2 | do | Benzene | 60 | 100 | Chloropropoxytrichlorotitanium | Paradimethylaminobenzaldehyde | 0.124 | Tetramethylene sulfoxide | 0.075 | Triphenylphosphine oxide | 0.026 | do | 0.363 | 18.2 | 99.4 | 79.5 | 3.6 |
| B3 | do | do | 60 | 100 | Di(chloroethoxy)dichlorotitanium | Paraphthalaldehyde | 0.101 | Dibutylsulfoxide | 0.04 | do | 0.026 | do | 0.363 | 17.9 | 99.6 | 78 | 2.8 |
| B4 | do | Toluene | 60 | 100 | Titanium tetrachloride | Benzaldehyde | 0.095 | Dimethyl sulfone | 0.032 | do | 0.019 | do | 0.363 | 16.7 | 99.1 | 72.6 | 3.3 |
| B5 | do | Xylene | 60 | 100 | Chloropropoxytrichlorotitanium | Cuminaldehyde | 0.124 | Diphenyl sulfoxide | 0.074 | Phospholane | 0.051 | do | 0.363 | 17.4 | 99.5 | 76 | 3.1 |
| B6 | do | Benzene | 60 | 100 | Tributoxychlorotitanium | Parachlorobenzoylchloride | 0.134 | Dimethyl sulfoxide | 0.044 | Triphenylphosphine oxide | 0.02 | do | 0.605 | 17.3 | 99.3 | 76 | 4.1 |
| B7 | do | do | 60 | 100 | Chloropropoxytrichlorotitanium | Orthochlorobenzaldehyde | 0.124 | Tetramethylene sulfoxide | 0.042 | Triphenyl phosphate | 0.031 | do | 0.363 | 15.4 | 99.4 | 67 | 3.1 |
| B8 | do | Heptane | 60 | 100 | Tetraphenoxytitanium | Para-anisoyl chloride | 0.21 | Diphenyl sulfoxide | 0.043 | Chlorodiphenylphosphine | 0.051 | do | 0.968 | 15.3 | 99.1 | 66.5 | 4.5 |
| B9 | do | Benzene | 60 | 200 | Titanylchloride | Salicylaldehyde | 0.068 | do | 0.024 | Triphenylphosphine oxide | 0.051 | do | 0.363 | 14.3 | 99.1 | 62.3 | 5.7 |
| B10 | do | Toluene | 60 | 200 | Titanium trichloroacetylacetonato | Veratraldehyde | 0.127 | Tetramethylene sulfoxide | 0.05 | Diethylchlorophosphate | 0.021 | do | 0.484 | 15.7 | 99.2 | 68.4 | 4.7 |
| B11 | do | Xylene | 60 | 200 | Titanyl debutoxide | 2,4-dichlorobenzaldehyde | 0.105 | Dimethyl sulfoxide | 0.028 | Triphenyl phosphate | 0.02 | do | 1.21 | 15.5 | 99.8 | 67.5 | 3.1 |
| B12 | do | Normalheptane | 60 | 100 | Titanium tetrachloride | Metanitrobenzaldehyde | 0.095 | Dimethylsulfite | 0.038 | Triphenylphosphine oxide | 0.022 | do | 0.484 | 14.7 | 99.2 | 63.8 | 5.8 |
| B13 | do | Benzene | 60 | 100 | Chloropropoxytrichlorotitanium | 2-methylbenzamide | 0.124 | Diphenyl sulfoxide | 0.034 | do | 0.061 | Diisobutyl aluminum chloride | 0.704 | 14.7 | 99.4 | 64 | 2.9 |
| B14 | do | Toluene | 60 | 100 | Titanium tetrachloride | Vanillin | 0.095 | Tetramethylene sulfoxide | 0.038 | do | 0.031 | Diethylaluminum chloride | 0.484 | 15.9 | 99.5 | 69.5 | 3.2 |

As a result, 19.4 g. of a cyclododecatriene fraction of a purity of 99.5 percent and of boiling points from 235°C to 250°C was obtained.

The yield of pure cyclododecatriene relative to the butadiene in the process batch, that is, the yield based on the butadiene content within the B-B fraction supplied, was 85.1 percent. The quantity of the by-product polymers was 2.6 g.

When, in place of the above described starting material, 60 g. of a raw B-B fraction which had not been pretreated and contained 0.18 percent of cyclopentadiene and other ingredients of the same composition as in the above described starting material was used, 6.9 g. of a cyclododecatriene of a purity of 85.2 percent was obtained in a yield of 25.8 percent together with 16.1 g. of by-product polymers.

Comparison Example 2

In the case where, in the catalyst system of Example C1, trioxane and dipheyl sulfoxide were not used, 8.1 g. of a cyclododecatriene of a purity of 96.0 percent was obtained in a yield of 34.1 percent together with 21.1 g. of by-product polymers.

Comparison Example 3

In the case where, in the catalyst system of Example C1, trioxane and triphenylphosphine oxide were not used, 8.5 g. of a cyclododecatriene of a purity of 96.5 percent was obtained in a yield of 35.9 percent together with 6.1 g. of by-product polymers.

Examples C2 through C12

The procedure set forth in Example C1 was carried out with catalysts of various recipes according to this invention as indicated in Table 4, whereupon the results as set forth also in Table 4 were obtained.

TABLE 4

| Example | Starting material (g.) | Solvent (cc.) | Ti compound (mmole) | Cyclic compound (mmole) | S compound (mmole) | P compound (mmole) | Al compound (mmole) | CDT fraction (g.) | CDT purity (percent) | CDT yield (percent) | By-product polymer (g.) |
|---|---|---|---|---|---|---|---|---|---|---|---|
| C1 | B-B fraction, 60 | Toluene, 100 | $Ti(OC_4H_9)Cl_3$, 0.5 | $(CH_2O)_3$, 0.5 | $(C_6H_5)_2SO_2$, 0.12 | $(C_6H_5)_3PO$, 0.13 | $Al(C_2H_5)_2Cl$, 3.0 | 19.4 | 99.5 | 85.1 | 2.6 |
| C2 | do | Benzene, 100 | $Ti(OC_2H_4Cl)_2Cl_2$, 1.0 | $(CH_2O)_3$, 0.5 | $(C_6H_5)_2SO_2$, 0.8 | $(C_6H_5O)_3PO$, 0.01 | $Al(C_2H_5)_2Cl$, 6.0 | 18.9 | 99.5 | 82.5 | 3.0 |
| C3 | do | do | $TiCl_4$, 0.5 | $(CH_2O)_3$, 0.13 | [thietane-1,1-dioxide ring], 0.25 | [phospholane ring, P–H], 0.025 | $Al(C_2H_5)_2Cl$, 4.0 | 19.2 | 99.3 | 83.8 | 3.2 |
| C4 | do | Xylene, 100 | $Ti(OC_2H_5)_4$, 0.7 |  | $(CH_3)_2SO_2$, 0.25 | $P(C_6H_5)_2Cl$, 0.01 | $Al(C_2H_5)_2Cl$, 11.6 | 18.5 | 99.0 | 80.3 | 3.3 |
| C5 | do | Toluene, 100 | $Ti(OC_2H_9)Cl_3$, 0.5 | $(CH_2O)_4$, 0.15 | $(CH_3)_2SO_2$, 0.4 |  | $Al(C_2H_5)_2Cl$, 2.25 | 19.3 | 99.6 | 84.3 | 3.7 |
| C6 | do | Benzene, 100 | $TiOCl_2$, 0.5 | $(CH_2O)_4$, 0.35 | [thiolane-1-oxide ring], 0.3 | $Cl(C_6H_5O)_2PO$, 0.05 | $Al(C_2H_5)_2Cl$, 5.0 | 18.7 | 99.1 | 81.1 | 3.1 |
| C7 | do | Toluene, 100 | $Ti(AcAC)Cl_3$ titanium trichloroacetylacetonate, 0.5 | $(CH_3CHO)_4$, 0.25 | $(C_6H_5)_2SO_2$, 0.45 | $(CH_3)_3PO$, 0.065 | $Al(C_2H_5)_2Cl$, 4.0 | 18.0 | 99.3 | 78.5 | 3.3 |

TABLE 4—Continued

| Example | Starting material (g.) | Solvent (cc.) | Catalyst system ||||| Results ||||
|---|---|---|---|---|---|---|---|---|---|---|
| | | | Ti compound (mmole) | Cyclic compound (mmole) | S compound (mmole) | P compound (mmole) | Al compound (mmole) | CDT fraction (g.) | CDT purity (percent) | CDT yield (percent) | By-product polymer (g.) |
| C8 | do | do | Ti(OC$_2$H$_5$)$_2$Cl$_2$, 0.5. | (CH$_3$CHO)$_4$, 0.5. | (CH$_3$)$_2$SO, 0.3. |  0.016 | Al(C$_2$H$_5$)$_2$Cl, 7.5. | 17.5 | 99.1 | 76.1 | 3.7 |
| C9 | do | do | TiCl$_4$, 0.5. | (CH$_2$S)$_3$, 0.15. |  0.15 | (C$_2$H$_5$O)$_3$PO, 0.02. | Al(C$_2$H$_5$)$_2$Cl, 3.5. | 17.8 | 99.3 | 77.6 | 3.4 |
| C10 | do | Xylene, 100. | Ti(OC$_2$H$_5$Cl)Cl$_3$, 0.5. | (CH$_2$S)$_4$, 0.35. | (CH$_3$)$_2$SO, 0.3. | (C$_4$H$_9$O)$_3$PO, 0.55. | Al(C$_2$H$_5$)$_2$Cl, 4.0. | 17.1 | 99.1 | 74.1 | 3.1 |
| C11 | do | Benzene, 100. | TiCl$_4$, 0.5. | (CH$_2$O)$_3$, 0.15. |  0.25 |  0.025 | Al(C$_2$H$_5$)$_2$Cl, 4.0. | 19.2 | 99.3 | 83.8 | 3.2 |
| C12 | do | Toluene, 100. | TiO(OC$_4$H$_9$)$_2$, 0.5. | (CH$_3$CHO)$_5$, 0.5. | (CH$_3$)$_2$SO$_2$, 0.15. | (C$_6$H$_5$)$_2$PCl, 0.01. | Al(C$_2$H$_5$)$_2$Cl, 15.0. | 19.5 | 99.3 | 80.3 | 3.3 |

We claim:
1. A process for producing cyclododecatriene-(1,5,9) which comprises contacting a B-B fraction, obtained by the cracking of naphtha and containing from 25 to 90 percent by weight of butadiene, with a Ziegler catalyst, thus resulting in cyclic trimerization of the butadiene, said catalyst comprising a combination of:
1. a titanium compound selected from the group consisting of titanium compounds of the formulae $TiX_nY_{4-n}$ and $TiOZ_2$, wherein X is halogen, Y is alkoxy, chloroalkoxy, acetylacetonato or acetoacetato, Z is X or Y and $n$ is zero or an integer of from 1 to 4,
2. a compound selected from the group consisting of
   a. five-membered heterocyclic compounds containing oxygen or nitrogen, the mole ratio of the heterocyclic compound to the titanium compound being from 0.15 to 1.5,
   b. benzene derivatives of the formula

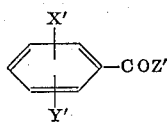

wherein each of X' and Y' is hydrogen, hydroxyl, alkyl, alkoxy, halogen, nitro, amino, monoalkylamino, dialkylamino, aminoaklyl, an aldehyde group, a carboxylic acid group or an esterified derivative thereof and Z' is hydrogen, halogen, amino, monoalkylamino or dialkylamino, the mole ratio of the benzene derivative to the titanium compound being from 0.15 to 1.5, and
   c. cyclic compounds of the formula

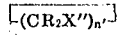

wherein X'' is oxygen or sulfur, R is hydrogen or alkyl and $n'$ is an integer of 3 or 4, the mole ratio of the cyclic compound to the titanium compound being from 0.15 to 1.5,
3. a compound selected from the group consisting of sulfur compounds, phosphorus compounds and mixtures thereof, said sulfur compounds and said phosphorus compounds being those of the formulae $SO_n R'_2$ and $PX'''_m Y'''_m$, respectively, wherein R' is alkyl, aryl, alkoxy, aryloxy or the two R' groups are fused with each other to form, together with the sulfur atom, a ring containing the sulfur atom and an alkylene or alkenylene group, X''' is alkyl, aryl, alkoxy, aryloxy or two X''' groups are fused with each other to form, together with the phosphorus atom, a ring containing the phosphorus atom and an alkylene or alkenylene group, Y''' is oxygen or halogen, n'' is an integer of 1 or 2, $m$ is an integer of from 1 to 3, and $m'$ is zero or 1 and
4. an aluminum compound of the formula $AlR''_2Cl$, wherein R'' is alkyl or aryl.

2. A process according to claim 1 in which the compound 2 is a five-membered heterocyclic compound of the formula

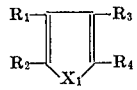

wherein $X_1$ is oxygen or $NR_o$, where $R_o$ is hydrogen or alkyl of up to 20 carbon atoms, and each of $R_1$, $R_2$, $R_3$ and $R_4$ is hydrogen, alkyl of up to 20 carbon atoms, alkoxy of up to 20 carbon atoms, halogen, carboxyl, carboxylate, the alcohol moiety of which contains up to 10 carbon atoms, an aldehyde group, hydroxymethyl, carboxymethyl, carboxylate methyl, the alcohol moiety of which contains up to 10 carbon atoms, acetyl, chlorocarbonyl, aminomethyl or mercaptomethyl.

3. A process according to claim 1 in which the compound 2 is a benzene derivative, wherein each of X' and Y' is hydrogen, hydroxyl, alkyl of up to 10 carbon atoms, alkoxy of up to 10 carbon atoms, halogen, nitro, amino, monoalkylamino of up to 10 carbon atoms, dialkylamino, each alkyl group of which contains up to 10 carbon atoms, aminoalkyl of up to 10 carbon atoms, an aldehyde group, carboxyl, or carboxylate, the alcohol moiety of which contains up to 10 carbon atoms, and Z' is hydrogen, halogen, amino, mono- or dialkylamino, each alkyl group of which contains up to 10 carbon atoms.

4. A process according to claim 1 in which the compound 2 is a cyclic compound, wherein X'' is oxygen and R is hydrogen or alkyl of 1 to 10 carbon atoms.

5. A process according to claim 1, in which the compound 2 is a member selected from the group consisting of furfural, furfuryl acetate, dichlorofurans, furfuryl mercaptan, furan carboxylic acids, furfurylamine, furoyl chlorides, pyrrole aldehydes, acetyl pyrroles, pyrrole carboxylic acids, furfuryl methyl ketone, and methylfurans.

6. A process according to claim 3 in which the compound 2 is selected from the group consisting of chlorobenzaldehydes, dimethylaminobenzaldehydes, phthalaldehydes, benzaldehyde, cuminaldehyde, chlorobenzoyl chlorides, anisoyl chlorides, salicylaldehyde, veratralaldehyde, dichlorobenzaldehydes, nitrobenzaldehydes, methylbenzamides, and vanillin.

7. A process according to claim 4 in which the cyclic compound is a member selected from the group consisting of trioxane, paraldehyde, tetraoxane, and metaldehyde.

8. A process according to claim 1 in which the compound 2 is a cyclic compound which is a member selected from the group consisting of trithiane and tetrathiaoctane.

9. A process according to claim 1 in which the compound 3 is a sulfur compound which is a member selected from the group consisting of sulfolene, alkyl ($C_1$ to $C_4$) sulfolenes, dialkyl ($C_1$ to $C_4$) sulfones, diphenyl sulfone, dialkyl ($C_1$ to $C_4$) sulfites, dialkyl ($C_1$ to $C_4$) sulfoxides, diphenyl sulfoxide, and tetramethylene sulfoxide, and the mole ratio of the sulfur compound to the titanium compound is from 0.1 to 2.0.

10. A process according to claim 1 in which the compound 3 is a phosphorus compound which is a member selected from the group consisting of trialkyl ($C_1$ to $C_4$) phosphine oxides, triphenylphosphine oxide, trialkyl ($C_1$ to $C_4$) phosphates, triphenyl phosphate, tricresyl phosphate, phospholane, phospholene, diphenyl chlorophosphate, dialkyl ($C_1$ to $C_4$) chlorophosphates, chlorodi-alkyl ($C_1$ to $C_4$) phosphines, and chlorodiphenyl phosphines.

11. A process according to claim 1 in which the compound 2 is a member selected from the group consisting of chlorobenzaldehydes, terephthaldehyde, furfural, and trioxane.

12. A process according to claim 1 in which the B-B fraction contains from 25 to 50 percent of 1,3-butadiene, a total of from 50 to 70 percent of butane and butene, from 0.02 to 2 percent of allene, from 0.02 to 2 percent of methylacetylene, from 0.05 to 2 percent of ethylacetylene, from 0.05 to 2 percent of vinyl acetylene, and from 0.1 to 2 percent of cyclopentadiene, all percentages being by weight.

* * * * *